United States Patent
Elshafei et al.

(10) Patent No.: US 9,068,873 B2
(45) Date of Patent: Jun. 30, 2015

(54) MULTIPHASE FLOW MEASUREMENT SYSTEM AND METHOD

(75) Inventors: Moustafa Elshafei, Dhahran (SA); Fouad Al-Sunni, Dhahran (SA); Sami El-Ferik, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 677 days.

(21) Appl. No.: 13/396,417

(22) Filed: Feb. 14, 2012

(65) Prior Publication Data

US 2013/0211746 A1 Aug. 15, 2013

(51) Int. Cl.
G01P 11/00 (2006.01)
G01F 1/74 (2006.01)
G01F 1/708 (2006.01)

(52) U.S. Cl.
CPC ............... G01F 1/74 (2013.01); G01F 1/7086 (2013.01)

(58) Field of Classification Search
CPC ................................ G01F 1/7086; G01F 1/74
See application file for complete search history.

(56) References Cited

U.S. PATENT DOCUMENTS

| | | |
|---|---|---|
| 4,396,943 A | 8/1983 | Lord et al. |
| 4,978,863 A | 12/1990 | Lyons et al. |
| 5,266,800 A | 11/1993 | Mullins |
| 5,365,326 A | 11/1994 | Chrisman et al. |
| 6,275,284 B1 | 8/2001 | Kiel et al. |
| 7,609,368 B2 | 10/2009 | Melnyk |
| 7,880,133 B2 | 2/2011 | Johansen |
| 2008/0015792 A1* | 1/2008 | Scott .............................. 702/25 |
| 2009/0121165 A1 | 5/2009 | Aroussi |
| 2009/0126502 A1 | 5/2009 | Wee et al. |
| 2013/0313437 A1* | 11/2013 | Li et al. .................... 250/363.03 |

* cited by examiner

*Primary Examiner* — Elias Desta
(74) *Attorney, Agent, or Firm* — Richard C Litman

(57) ABSTRACT

The multiphase flow measurement system and method includes video sensors and illumination along a pipe upstream, and a similar arrangement of sensors and illumination downstream displaced from the first location by a known distance utilized for velocity calculation between images at both locations. Image capturing and processing is done from video data at both locations. Objects corresponding to each flow phase in the video images are characterized and sorted by size, color, spectral properties, shapes, and pattern features using automatic pattern recognition. Image cross-correlation and pattern recognition are applied to each group of objects corresponding to one or more flow phases to estimate the velocity of each phase based on the delay calculation. Flow velocity is calculated from the weighted average of the phase velocities. Overall flow type is estimated using the estimated phase velocities and the areas occupied by the objects corresponding to each phase in the images.

5 Claims, 8 Drawing Sheets

Fig. 6A
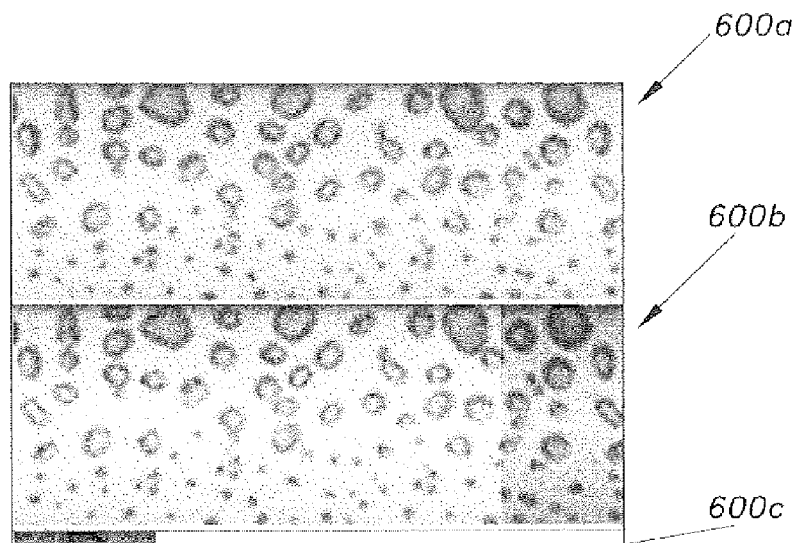
Fig. 6B
Fig. 6C
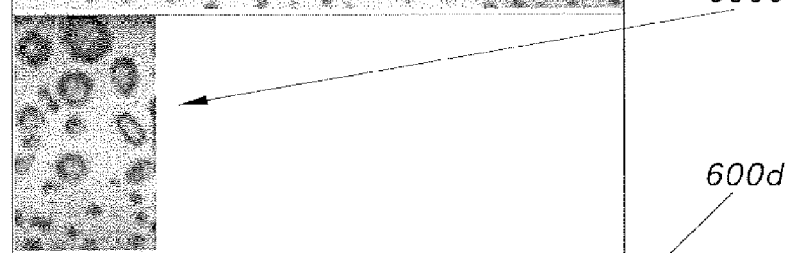
Fig. 6D
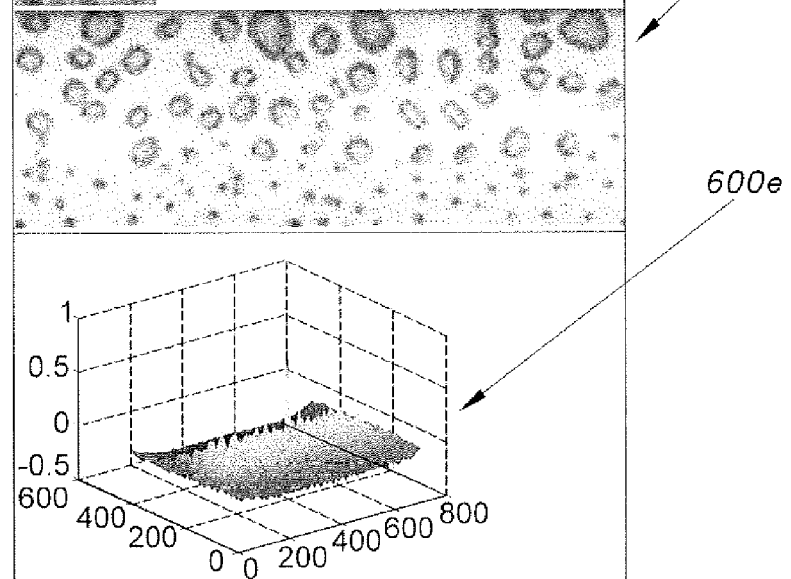
Fig. 6E

MULTIPHASE FLOW MEASUREMENT SYSTEM AND METHOD

BACKGROUND OF THE INVENTION

1. Field of the Invention

The present invention relates to multiphase flow measurement, and particularly to a multiphase flow measurement system and method that classifies and correlates flow phases based on image processing of the flow.

2. Description of the Related Art

Multiphase flow plays an important role in oil and gas industry, the process industry, the nuclear industry, and many others. For example, accurate monitoring of multiphase flow is necessary to transport un-separated gas-oil-water mixtures over quite long distances.

This has enormous economical impact on some offshore developments, and multiphase flow-lines have, in some cases, replaced topside offshore and remote wells installations. Sending gas and hydrocarbon liquid together over hundreds of kilometers to shore in a multiphase flow-line saves cost, both because local processing is reduced (water separation is cheaper than gas-condensate-water separation) and because one line replaces two by transporting gas and condensate together.

Monitoring the flow regime in the transmission pipe is important to maximize the rate of flow without driving the fluid to slug or froth mode, which creates enormous stress on the pipes, valves, pumps, and other operating instruments.

Thus, a multiphase flow measurement system and method solving the aforementioned problems is desired.

SUMMARY OF THE INVENTION

The multiphase flow measurement system includes video sensors and illumination along a pipe upstream, and a similar arrangement of sensors and illumination downstream displaced from the first location by a known distance utilized for delay calculation between images at both locations. Image capturing and processing is done from video data at both locations.

Objects corresponding to each flow phase in the video images are characterized and sorted by size, color, spectral properties, shapes, and pattern features using automatic pattern recognition. Image cross-correlation and pattern recognition are applied to each group of objects corresponding to one or more flow phases to estimate the velocity of each phase based on the delay calculation.

Flow velocity is calculated from the weighted average of the phase velocities. Overall flow type is estimated using the estimated phase velocities and the areas occupied by the objects corresponding to each phase in the images.

These and other features of the present invention will become readily apparent upon further review of the following specification and drawings.

BRIEF DESCRIPTION OF THE DRAWINGS

FIG. 6A shows the initial "A" side image frame in a multiphase flow measurement system according to the present invention.

FIG. 6B shows the strip marked image frame in a multiphase flow measurement system according to the present invention.

FIG. 6C shows the cut strip of the image frame in a multiphase flow measurement system according to the present invention.

FIG. 6D shows the "B" frame-template cross-correlation image in a multiphase flow measurement system according to the present invention.

FIG. 6E shows the cross-correlation peak plot in a multiphase flow measurement system according to the present invention.

Similar reference characters denote corresponding features consistently throughout the attached drawings.

DETAILED DESCRIPTION OF THE PREFERRED EMBODIMENTS

Figure 1:
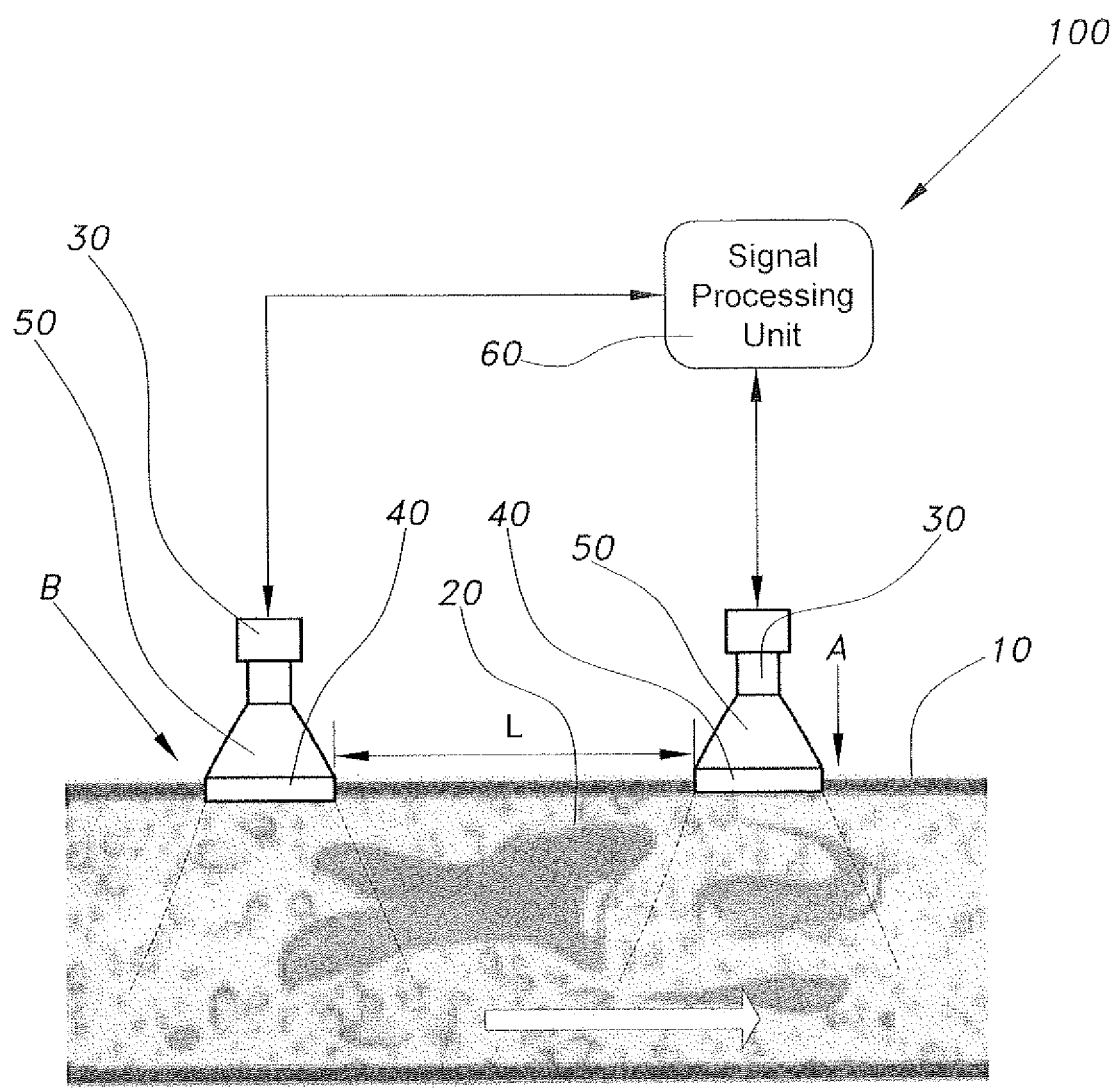
FIG. 1 is a schematic diagram of a multiphase flow measurement system according to the present invention.

As shown in FIG. 1, the multiphase flow measurement system 100 includes video sensors 30, illumination and optics 50 along a pipe 10 at upstream location A, and a similar arrangement of sensors and illumination at downstream location B displaced from the first location by a known distance L, which is utilized for delay calculation between images at both locations. Image capturing and processing is done from video data at both locations A and B.

Objects corresponding to each flow phase in the video images are characterized and sorted by size, color, spectral properties, shapes, and pattern features using automatic pattern recognition. Image cross-correlation and pattern recognition are applied to each group of objects corresponding to one or more flow phases to estimate the velocity of each phase based on the delay calculation.

Flow velocity is calculated from the weighted average of the phase velocities. Overall flow type is estimated using the estimated phase velocities and the areas occupied by the objects corresponding to each phase in the images.

The system 100 has video sensors 30 disposed along a pipe section 10 carrying a multiphase flow 20. The system 100 includes video heads installed at locations A and B separated by distance L. The choice of distance L depends on the operating range of the fluid speed and the pipe diameter. Each head includes a transparent window 40, an optical system 50, and high-speed video cameras 30 with the ability to synchronize their frame capturing actions. Controllable sources of illumination and optical filters are included in the optics 50 for adjusting illumination colors and spectrum. Sufficient memory to store several seconds of video is included in the high-speed cameras 30. The head assembly is hermetically sealed for protection against environmental dust, oil spill, water, etc., to the industry standard of the field of application.

Figure 2A:
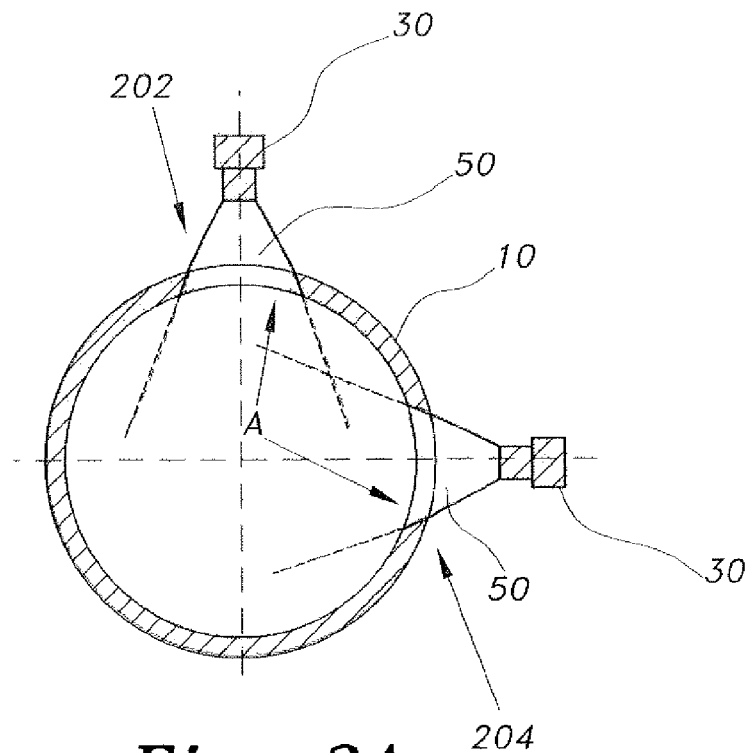
FIG. 2A is a section view showing an exemplary configuration of cameras in relation to an "A" section of pipe in a multiphase flow measurement system according to the present invention.
Figure 2B:
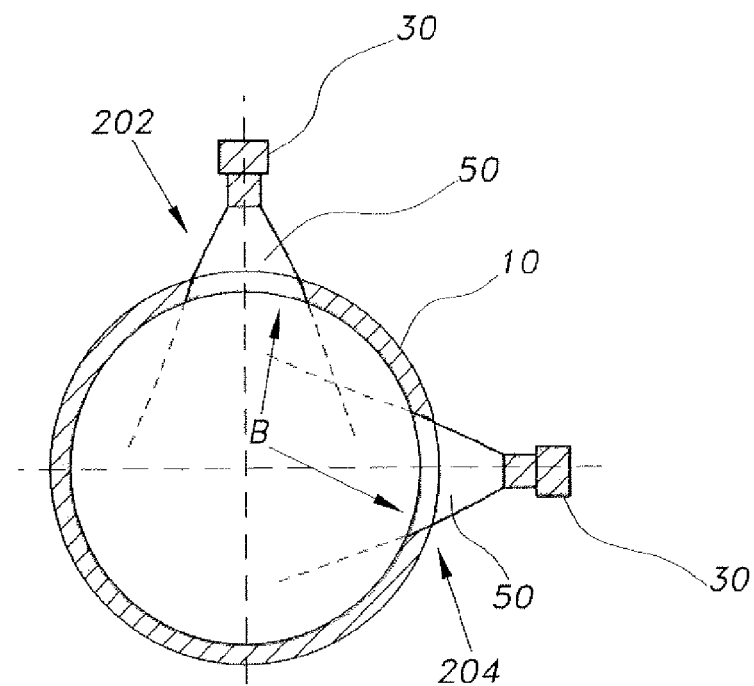
FIG. 2B is a section view showing an exemplary configuration of cameras in relation to a "B" section of pipe in a multiphase flow measurement system according to the present invention.
Figure 3:
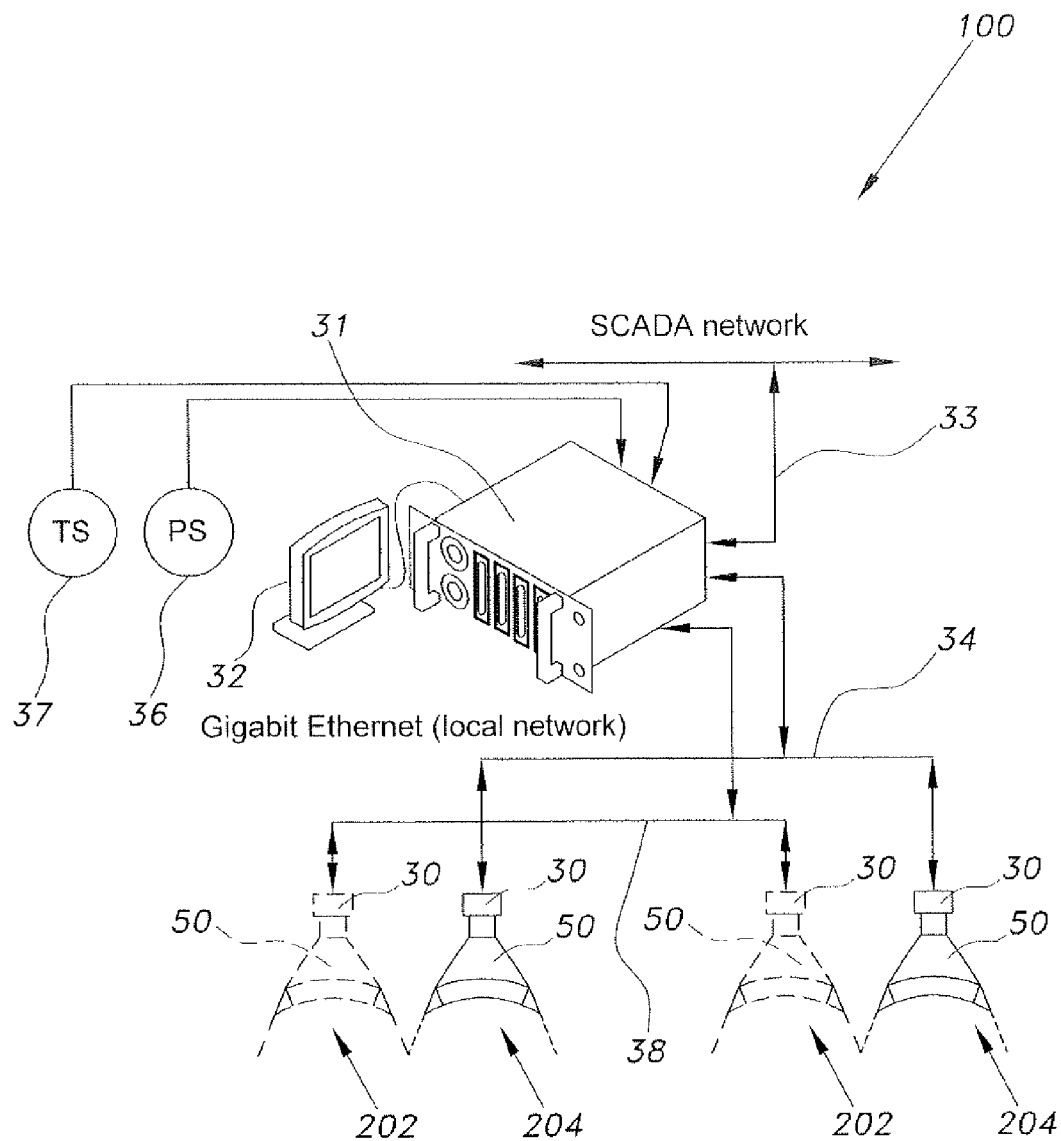
FIG. 3 is a schematic diagram showing more details of the multiphase flow measurement system according to the present invention.

Alternatively, as shown in FIGS. 2A and 2B, the locations A and B each may include two or more perpendicularly mounted heads 202 and 204. As shown in FIG. 3, the two perpendicular sets of heads 202 and 204 can synchronously capture frame sequences to be used by a computational server 31, which constructs possible 3D images of the flow for better determination of the effective flow area and volume flow rate of each phase.

The signal processing unit 60 could be a standalone unit or a unit that resides in SCADA server 31. SCADA server 31 is a high performance computing server supporting several high speed video channels, and one or more high performance multi-core processors for execution of concurrent multitasks. The computing server unit 31 is connected to a local display screen 32, preferably with touch screen capability and a control keyboard. The display/keyboard combination 31 is optional for maintenance purposes and for local monitoring and initial setup. The system 100 can be fully operational in a remote control mode by any host connected through the SCADA network 33. The computation server 31 is preferably rack mountable and includes at least one multi-core processor and one or more high speed communication channels (HSCs). A first HSC connects to a host computer or to the SCADA network 33. A second HSC 34 connects to the high speed video heads 204. A third HSC 38 connects to the high speed video heads 202. The server 31 includes a data acquisition board for possible connection to a pressure sensor 36 and temperature sensor 37 for normalization of the flow rates, if needed.

Figure 4:
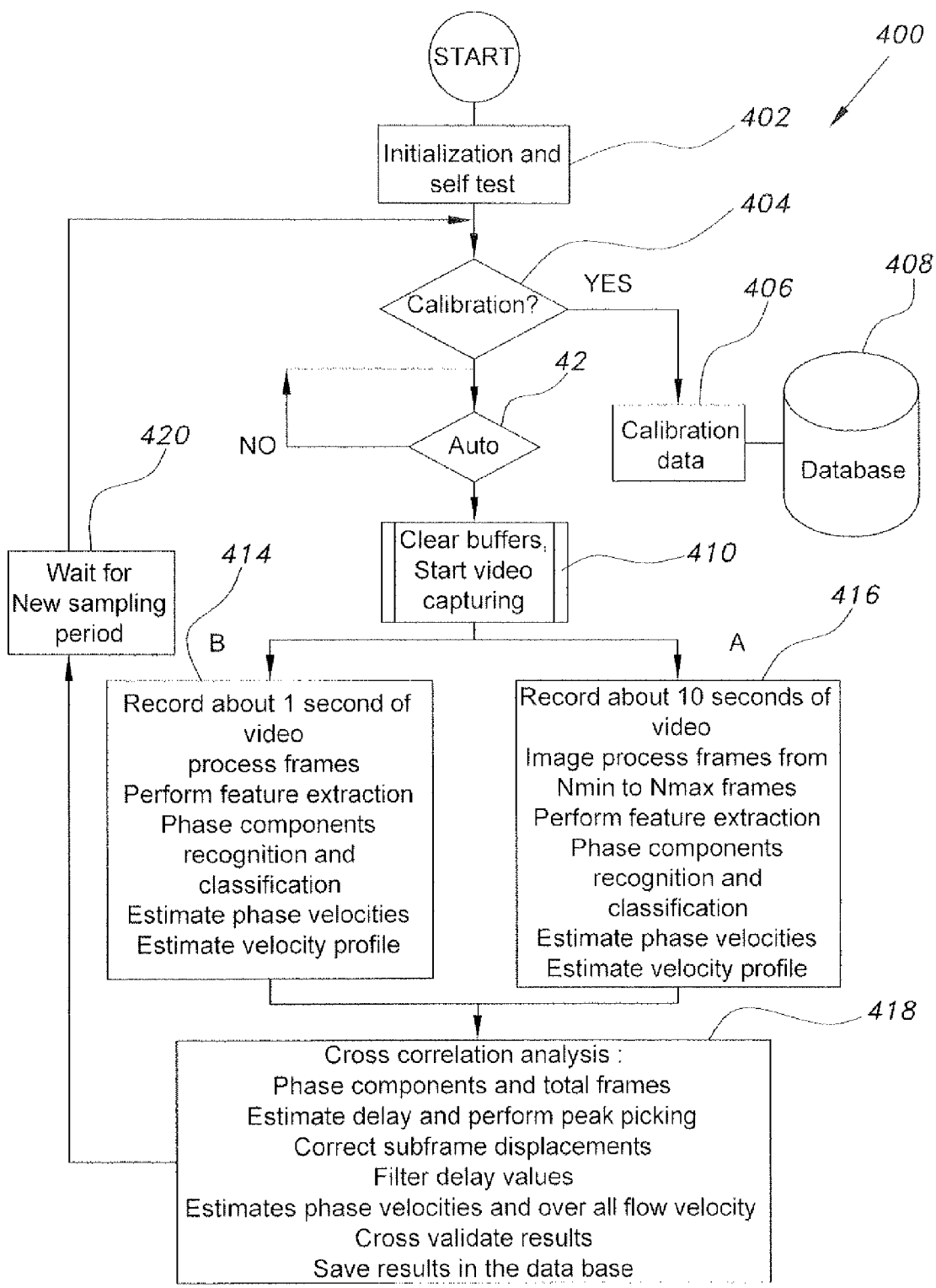
FIG. 4 is a flowchart showing the steps in a multiphase flow measurement method according to the present invention.

As shown in FIG. 4, the process 400 includes system initialization and self-test step 402. Parameters stored in the database 408 are used for the initialization and self-test step 402. The system first checks the operation of such internals as memory and hard disk, as per the factory set up. The factory setup parameters include the pipe diameters, the number of attached cameras, and device drivers for the cameras. Next, the system performs self-test step 402 to check the operation of attached devices, as per the configuration in the database 408, for example, communication with the attached cameras, with the LCD display, with the host Local Area Network, with the sensors, and the like.

The system procedure 400 also checks the operation of the cameras and automatically adjusts illumination color/spectrum for maximum image contrast, and calculates the cameras' FOV (field of view) using fixed markers in the pipe section.

Once the self-test passes, a calibration check 404 is performed. If the system is in calibration, then the operator is prompted to enter calibration data, e.g., lab values, phase velocity values, volume fractions, overall flow rate for one or more measurements together with their time stamps, which is supplied at step 406. The system matches the calibration values against the previously stored measurements and adjusts the correction factors. In the maintenance mode, the user can selectively stream the videos to the LCD display, override the automatic illumination adjustments, change certain image processing parameters, specify values for cameras FOV, specify expected operating range for each phase, and specify the sampling period (10, 20, 30, 60 second, 15 minutes). The operator can also initiate the processing procedure for one complete sample (measurement on demand). At step 420, the system then waits for the operator to put the system in the automatic mode.

Once placed in auto mode, the system continuously performs measurements at the specified sampling rate and stores the measurements in database 408. At the beginning of each sampling period, at step 410, the video cameras memories are flushed, and the system initiates synchronous A side video capturing 416 and B side video capturing 414 via selected cameras for a predetermined period, e.g., 1 second for B side video capturing (step 414) and 10 seconds for A side video capturing (step 416), wherein the triggered cameras capture and store video at the specified frame rates.

Preferable frame rates are 100 frames/sec for phase speed less than 1 meter/sec, 250 frames/sec for up to 10 meter/sec and 500 frames for up to 50 meter/sec, assuming FOV of about 30-40 cm. For smaller pipes, where FOV can be limited, higher frame rates are preferable. The processing at primary location A focuses on the most recent frames 20-50 frames. The frames are processed according to step 418, which includes phase component and total frames calculation, delay estimation, peak picking, subframe displacements correction, updating filter delay values, estimating phase velocities and overall flow velocity, performing cross correlation, cross validating the results, and saving the results in database 408. The various objects are classified by size and/or color and shape. For example bubbles of gas in oils are classified. Similar objects, e.g., big bubbles, are isolated and correlated with previous frames. The correlation then reveals the displacements of the objects during the frame period. The displacements are then used to calculate the velocity vector, and the longitudinal speed. The total size of the bubbles in the exposed volume indicates the volume fraction of the phase. For example, in dispersed flow of gas bubbles in oil, the gas volume fraction=area of bubbles/total frame area.

Similar procedures are used to estimate all phase velocity, as well as velocity profiles and total flow velocity. The calculations between successive frames are repeated and averaged/interpolated to determine the estimates of phase velocities.

The video collected from location B is similarly treated to identify and classify various objects based on their size, shape, and/or color. Only frames from $N_{min}$ to $N_{max}$ are processed, where $N_{min}$ and $N_{max}$ correspond to the expected range of phase velocities.

Next the sections of processed frames from B are cross-correlated with the most recent frames from A, and the time delay is then determined. Here again, the time delay is calculated based on cross correlation of at least 10 frames of A with frames from B. All time delays are further corrected by considering intra-frame displacements. The corrected delays are then filtered and used to estimate the velocity of the phases.

Finally, the calculated phase velocities and volume fractions are cross-validated, and an overall estimate is determined. The estimated phase velocities and object sizes are then used to determine the type of flow. All the flow parameters are time-stamped and stored in database 408. The most recent values and the historical values cam be retrieved by hosts on the SCADA network using standard OPC DA and OPC HDA servers that come with the system. After step 418, the system waits for a new sampling period at step 420.

Exemplary procedural steps used in processing the video data and to identify and classify the flow phases are presented in Tables 1 and 2, below.

TABLE 1

Procedure_1A - Objects determination and isolation procedure pseudocode

Get a frame image
Convert to the gray scale
Create an image with a uniform background
Adjust the contrast in the uniform image
Perform edge determination using gradient based method
Create a binary version of the image and fill holes
Determine the number of objects in the image
Examine the label matrix
Measure properties of objects in the image

TABLE 2

Procedure_1B Image Cross-Correlation Function pseudocode

Read Image
Choose Subregions of Each Image
Do Normalized Cross-Correlation and Find Coordinates of Peak
Find the Total Offset Between the Images The Objects Determination and Isolation and the Image Cross Correlation functions are the core methods used in constructing other specialized image processing methods.

Procedure_2 is a 3D Objects determination from two orthogonal cameras and includes the steps summarized in Table 3.

TABLE 3

3D Objects Determination from Two Orthogonal Cameras

Follow steps in procedure 1A to create a binary image of one class of objects from the top view camera
Follow steps in procedure 1A to create a binary image of the same class of objects from the side view camera where the two images are synchronized
Extend the top view image and the side view image to 3D matrices by repeating the images
Turn the side view image
Multiply the two matrices to get the common pixels
Compute the size of the objects by summing up their pixels If we use wave lengths so that we get gray images with gray density that depends on the absorption by the body, and assuming a homogeneous body so that the gray depends on the thickness of the body, then the 3D body can be constructed as follows.

The 3D object space is considered to be a coordinate system (OXYZ). Each pixel of the object is denoted as $X_{ijk}$, with an array of size N1×N2×N3. The two orthogonal image space is represented by a coordinate system (OXZ) and (OYZ), with size N1×N3 and N2×N3, respectively.

To describe the approach simply, the object at this stage is assumed to be filled by a homogeneous material. We consider the object as a binary matrix, where each element can take a zero or one value, depending on whether the element belongs to the object or not, i.e., $X_{yk} \in [0,1]$, and $X_{ijk}$ takes the value 1 if the pixel belongs to the object, and the value 0 otherwise. The orthogonal projection images represented by a grayscale value are directly proportional to the number of object voxels along the projection path. They satisfy the following equations:

$$\sum_{i=1}^{N1} X_{ijk} = f_y(j,k), j = 1, 2, \ldots, N2; k = 1, 2, \ldots, N3$$

$$\sum_{i=1}^{N2} X_{ijk} = f_x(i,k), i = 1, 2, \ldots, N2; k = 1, 2, \ldots, N3$$

The problem is how to reconstruct the slice X from the slice projection profiles $f_x(i,k)$ and $f_y(j,k)$. The reconstruction problem as stated is ambiguous because of the possibility of having one, several, or possibly no solutions fulfilling the given slice. In order to reduce such indeterminacy, the solution must be regularized by including some a priori information about the slice. The reconstruction will start with an initial approximate object. In the case of the reconstruction of cardiac ventricles, the initial object shape of the vessels is usually assumed to be elliptical. Let $X'_{ijk}$ be a given 3D approximate initial solution, and let:

$$\sum_{i=1}^{N1} X'_{ijk} = f'_y(j,k), j = 1, 2, \ldots, N2; k = 1, 2, \ldots, N3$$

$$\sum_{i=1}^{N2} X'_{ijk} = f'_x(i,k), i = 1, 2, \ldots, N1; k = 1, 2, \ldots, N3$$

Then the approximation Error can be defined as:

$$E = \frac{1}{N_1 N_3} \sum \sum_{i=1}^{N2} [f'_x(j,k) - f_x(j,k)]^2 + \frac{1}{N_2 N_3} \sum \sum_{k=1}^{N3} [f'_y(i,k) - f_y(i,k)]^2$$

It can be imposed as minimization problem using PS or a genetic algorithm. The cross correlation between a template t and an image f is given by:

$$R(u,v) = \frac{\sum_{x,y} [f(x-u, y-v) - \bar{f}_{uv}][t(x,y) - \bar{t}]}{\sqrt{\sum_{x,y} [f(x-u, y-v) - \bar{f}_{uv}]^2 \sum_{x,y} [t(x,y) - \bar{t}]^2}}$$

where f is the image $\bar{f}_{uv}$ is the mean value of f under the template, t is the template and $\bar{t}$ is the mean value of the template.

In the preceding equation, the variables u and v are the offset between the images. The procedure returns a matrix R of the values of the correlation, from which the offsets (u*, v*) in pixels, corresponding to the peak of correlation, can be obtained.

For 3D objects the cross correlation is given by:

$$R(u,v,w) = \frac{\sum [f(x-u, y-v, z-w) - \bar{f}_{uvw}][t(x,y,z) - \bar{t}]}{\sqrt{\sum_{x,y,z} [f(x-u, y-v, z-w) - \bar{f}_{uvw}]^2 \sum_{x,y,z} [t(x,y,z) - \bar{t}]^2}}$$

Clearly, the image and 3D cross correlation is different from signal cross correlation, which is used in the conventional flow meters. Signal cross correlation is only defined for time varying signals, while image cross correlation is performed primarily in two and three spatial dimensions.

Figures 5A, 5B, 5C, 5D, 5E:
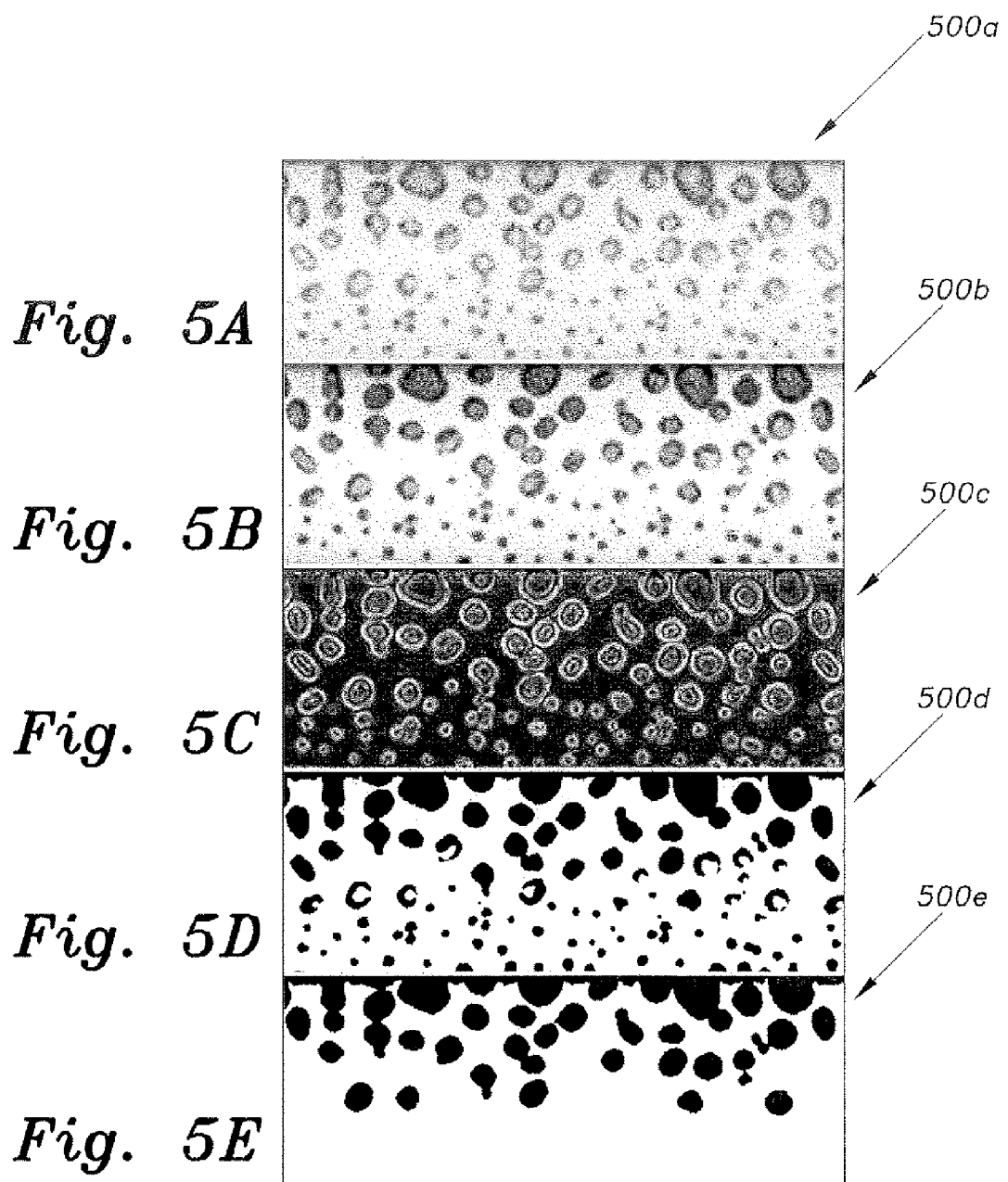
FIG. 5A shows the initial image frame in a multiphase flow measurement system according to the present invention.
FIG. 5B shows the gray scale image frame in a multiphase flow measurement system according to the present invention.
FIG. 5C shows the segmented image frame in a multiphase flow measurement system according to the present invention.
FIG. 5D shows the morphologically reconstructed image frame in a multiphase flow measurement system according to the present invention.
FIG. 5E shows the filled and labeled image frame in a multiphase flow measurement system according to the present invention.

Procedure_3, Isolating Big and Small Bubbles function, builds on Procedure_1A and is illustrated in FIGS. 5A-5E, images 500a through 500e. As shown in FIG. 5A, a color image frame is obtained. The color image frame is converted to gray scale, after which a contrast-limited adaptive histogram equalization is performed, the results of which are shown in FIG. 5B. Subsequently, a gradient magnitude is used as a segmentation function, the results of which are shown in FIG. 5C. Next, opening by reconstruction and closing by reconstruction morphological operations are performed to mark the foreground objects, the results of which are shown in FIG. 5D. The image shown in FIG. 5E results from holes being filled in, objects being labeled, areas of the objects computed, and objects being sorted by their size, wherein objects less than $A_{min}$ are removed from the image. Total black pixels/Total pixels are also calculated. As stated above, once the bubbles are isolated from the background and labeled, they are sorted by Area. Only bubbles greater than a predetermined size threshold are kept for determination of the gas phase velocity. The threshold parameter is called $\beta_2$. The parameter determines the percent of the area of the bubbles to be included in the big bubble class ($\beta_2$ is approximately 40%). The small and tiny bubbles are fully carried by the liquid phase. As such, the smaller, tiny bubbles are isolated and used to determine the liquid phase velocity. The tiny bubbles image fraction should be approximately $\beta_3$=15% or less.

Procedure_3 is used to process two successive frames from the camera at A. Then Procedure_2 is used to cross correlate the two consecutive frames and determine the amount of displacement in the direction of flow.

Procedure_4 provides phase velocity based on cross-correlation of two images from the same camera. The speed of phase flow can be determined as follows:

$$v(t) = \beta_1 * \frac{d(t)}{W} * FOV/T$$

where d(t) is the displacement in pixels between frame A at time t and frame B at time t−1, W is the image width in pixels, FOV is the field of view in meters (the physical width of the image in the pipe), T is the frame period, and β is a calibration correction value to compensate for variability in FOV.

Procedure_5, class velocity based on cross correlation of images from the same camera, calls Procedure_4 successively for class images for the last 10 to 20 frames. The class velocity is taken as the average of the estimated velocity from each two successive frames. The procedure returns the average class velocity. Then Procedure_4 is repeated for each class of objects separately to determine its speed.

Procedure_6, Estimated Gas velocity based images from the same camera, calls Procedure_5 to estimate the velocities of the big bubble class and the tiny bubble class separately. The gas velocity is:

$$\frac{\beta_2 * v_{bb} + \beta_3 * v_{sb}}{\beta_2 + \beta_3}$$

Procedure_7, Estimated Gas volume fraction, uses the overall area occupied by the bubbles to determine an approximate value of the gas volume fraction. In this procedure, $a_g$=$\beta_5$*total area of the bubbles in pixels/Frame area in pixels where $\beta_5$ is a correction factor to be determined by calibration. The average speed of the gas phase=(fractional area of large bubbles/all bubbles)*speed of large bubbles+(fraction area of small bubbles/all bubbles)*speed of tiny bubbles.

Procedure_8, Determination of the flow average speed based on cross correlation between A & B, is illustrated by example 500e in FIG. 5E, where the steps were performed to determine the number of objects in the image. The objects, corresponding to bubbles, are sorted based on their area, and only objects greater than a certain predetermined size are kept. The Procedure_8 pseudocode steps for estimating phase velocities using cross correlation between frames of locations of A and B are given in Table 4.

TABLE 4

Procedure_8, Estimate phase velocities pseudocode

Figure 7:
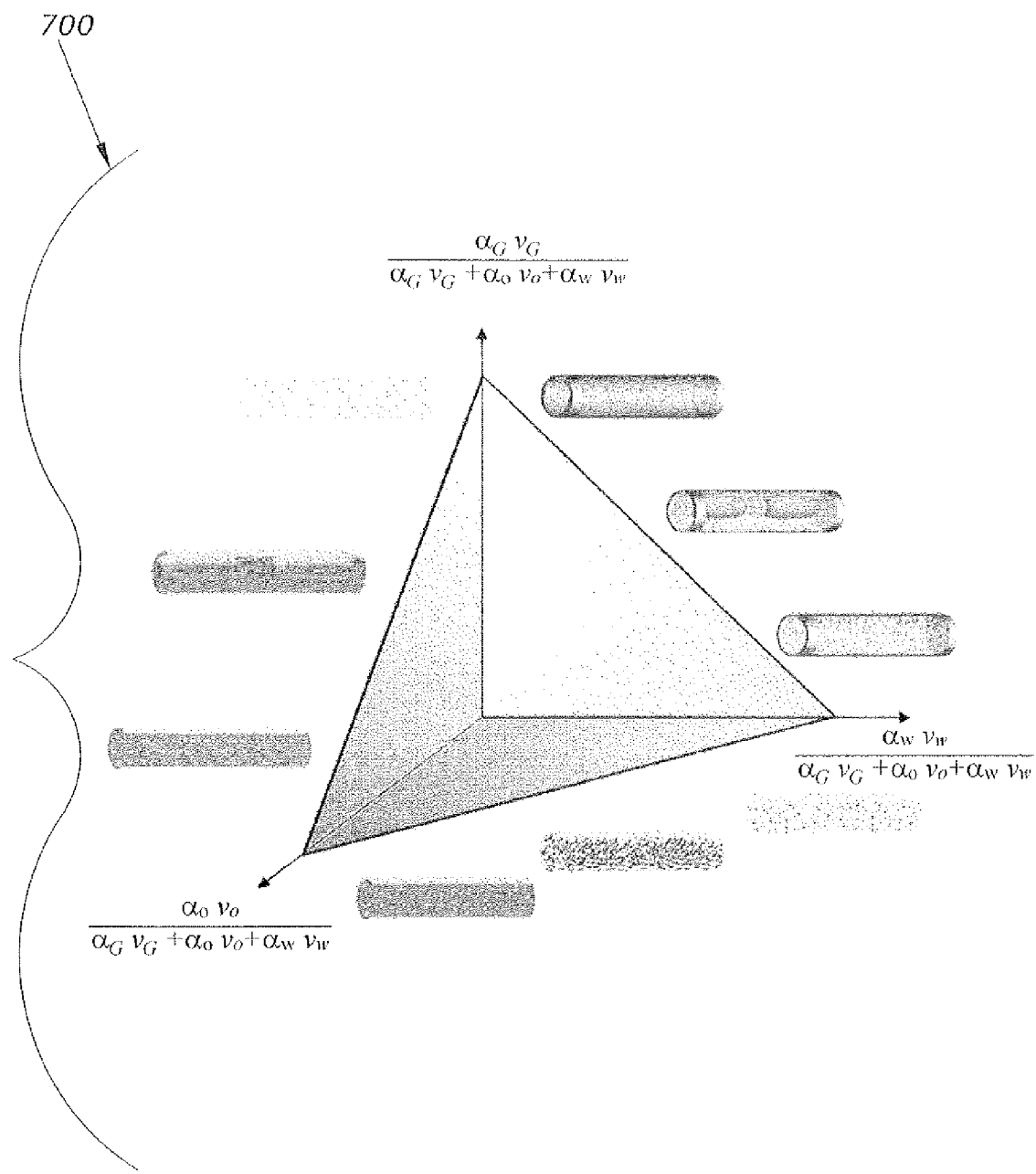
FIG. 7 is a schematic diagram showing multiphase flow type classification in a multiphase flow measurement system according to the present invention.

Perform image analysis to isolate objects corresponding to specific phase (e.g., large bubbles at frame A(t));
For k = t-$n_{min}$ to t-$N_{max}$, perform the above image analysis on frame B(k);
Let A2(t) be the right half of A(t), assuming direction of flow is left to right;
Perform cross correlation analysis between A2(t) and B(k);
Determine the value of the peak correlation;
Find the frame delay k for the maximum peak correlation;
Determine the phase velocity = L/(k+$x_{poisition}$)T;

FIG. 7, plot 700, illustrates classification of multiphase flow types based on volume fraction for an exemplary fluid flow containing a gas phase, an oil phase, and a water phase, the equations in FIG. 7 relying upon the continuity equation for fluid flow through a conduit. Procedure_9, Determination of the Flow regime using fuzzy-NN pseudo code, is summarized in Table 5.

TABLE 5

Procedure_9, Determination of the Flow regime using fuzzy NN

Figure 8:
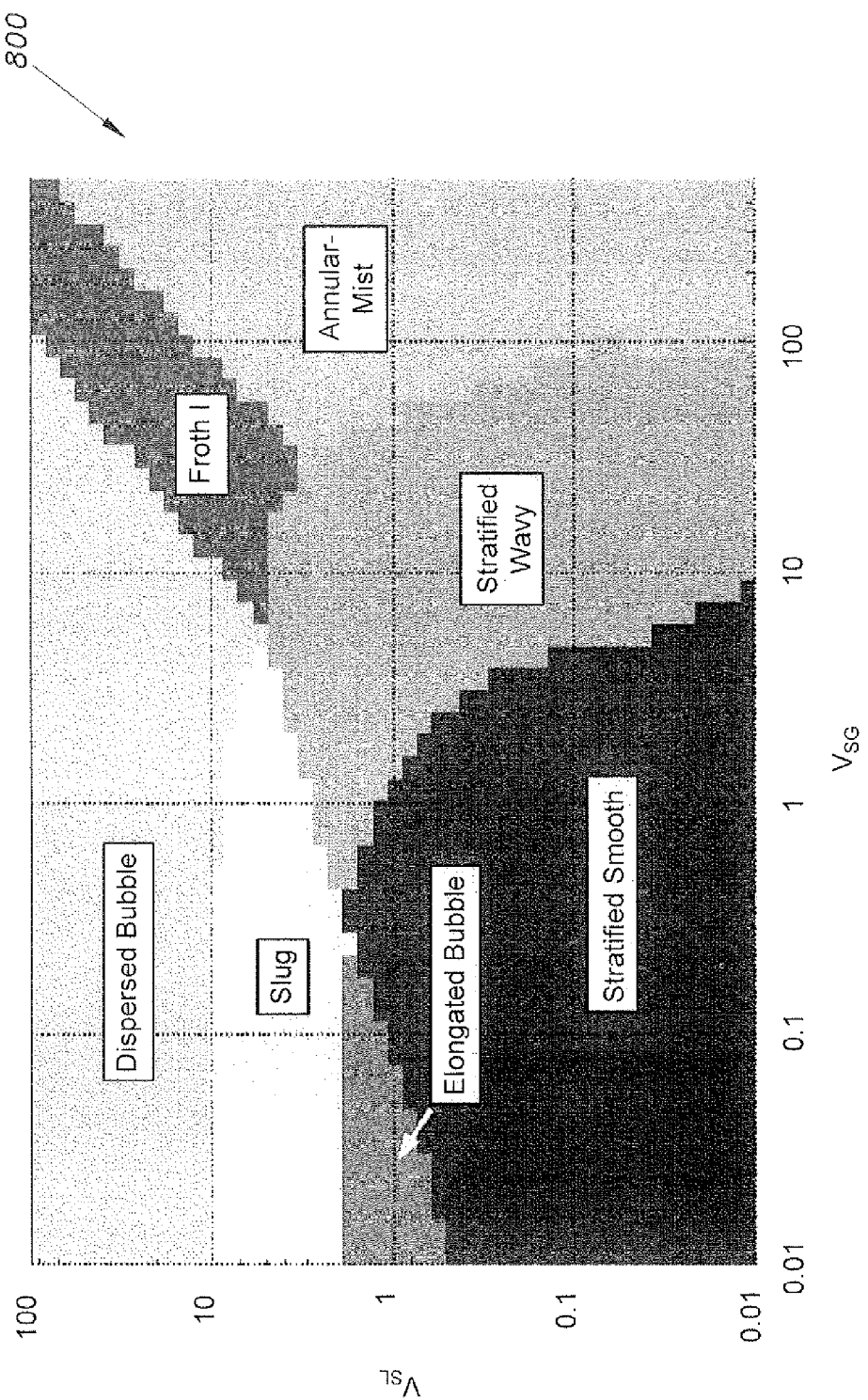
FIG. 8 is a flow pattern map based on superficial speeds in a multiphase flow measurement system according to the present invention.

Input $v_{sg}$, $v_{so}$, $v_{sw}$, $v_{ss}$ gas, oil, water, sand;
Output 7 classes (stratified smooth, stratified wavy, elongated bubbles, slug, dispersed bubbles, froth, annular mist) (see Fig. 8 plot 800);
Provide the probability membership value for each class using statistics on foreground object sizes (e.g., bubble sizes).

For a two-phase calculation, such as bubbles of gas in liquid oil, or water and oil flow, image processing can identify the large bubble objects and cross-correlate them with similar objects from the first site (upstream direction). Let the time delay be $taw_1$ and $taw_2$. Accordingly, the velocities will be $v_1$=d/$taw_1$ and $v_2$=d/$taw_2$. Similarly, the average flow can be determined as follows:

$$AV = A1v_1 + A2v_2$$

A1 and A2 may be determined in two ways: (1) by using two perpendicular synchronized cameras; or (2) using an endoscope along the direction of flow with its FOV covering the pipe cross section. Using least squares estimation from the successive estimations of the velocity;

$$A*V(k) = A1*v_1(k) + A2*v_2(k) \text{ for } k = t, t-1, t-2, t-m$$

$$\phi = \begin{bmatrix} v_1(t) & v_2(t) \\ \vdots & \vdots \\ v_1(t-m) & v_2(t-m) \end{bmatrix} \text{ and } \psi = \begin{bmatrix} V(t) \\ \vdots \\ V(t-m) \end{bmatrix}$$

then $\begin{bmatrix} A_1 \\ A_2 \end{bmatrix} = A(\phi^T\phi)^{-1}\phi^T\psi$.

Notice that $A_1+A_2=A$, and one equation is enough to use a Kalman filter. For this procedure, use markers or fixed light sources for automatic calibration of the camera FOV. Automatic self-test is made by changing illumination color spectrum and intensity for maximum contrast using image histogram. Calibration can be done off line by recording video for short period corresponding to specific phase volume fraction, or on line by taking field samples, providing lab results, and comparing against the device measurements ($v_g$, $v_{gcal}$), ($v_o$, $v_{ocal}$), etc. Finally, the pipe diameter, pressure, temperature, ambient temp, type of phase mixture, number components, etc, and the expected range of phase volume fraction are input.

The image cross-correlation steps are illustrated in images 600a through 600d of FIGS. 6A through 6D. Plot 600e of FIG. 6E shows the cross correlation peak of a successful match.

With respect to resolution, let the distance between the sensors be L meters, and the frame period be T=1/fps, where fps is the number of frames per second. The error increases with increased fluid velocity. If max fluid velocity is $V_{max}$:

$$\frac{\Delta v_m}{v_m} = -\frac{1}{N_m},$$

where $N_m$ is the measured delay in terms of T

The worst case is at $V_{max}$. For example, if L=1 meter, fps=500, and $V_{max}$=25 m/sec, then $N_m$=1/($V_{max}$*T)=1/(25*0.002)=20 frames, corresponding to a relative error of 5%, assuming an error of order of one frame.

The image processing procedure is built using standard methods available from MATLAB® image processing tool box. The entire procedure can then be loaded in any embedded computer system and used as a stand-alone smart multiphase flow computer. The high speed camera is from AOS Technologies AG, Switzerland.

The procedure described above relates generally to a method and apparatus for multiphase flow meter based on computational methods for image and video processing to identify and quantify the volume and speed of each component of a flow. The technique can be applied to two-phase and multiphase fluid flow. Unlike most flow meters, which produce a single electrical signal to assess the volume flow, the present method uses various image processing techniques to identify each of the flow components; including shape, size, color, position in the pipe, spectral properties, and mobility in order to compute the volume fraction of each phase and its speed.

It will be understood that the diagrams in the Figures depicting the multiphase flow measurement system are exemplary only, and may be embodied in a dedicated electronic device having a microprocessor, microcontroller, digital signal processor, application specific integrated circuit, field programmable gate array, any combination of the aforementioned devices, or any other device that combines the functionality of the multiphase flow measurement system onto a single chip or multiple chips programmed to carry out the method steps described herein, or may be embodied in a general purpose computer having the appropriate peripherals attached thereto and software stored on a non-transitory computer readable media that can be loaded into main memory and executed by a processing unit to carry out the functionality of the apparatus and steps of the method described herein.

It is to be understood that the present invention is not limited to the embodiments described above, but encompasses any and all embodiments within the scope of the following claims.

We claim:

1. A multiphase flow measurement system, comprising:
   a first video head assembly having at least one video head disposed at a first location along a conduit;
   a second video head assembly having at least one video head disposed at a second location along the conduit, the first location and the second location being separated by a known distance, the first location and the second location having a transparent portion allowing the first video head assembly and the second video head assembly to video record contents of the conduit flowing through the first and the second locations;
   a first adjustable illumination source illuminating contents of the conduit flowing through the first location;
   a second adjustable illumination source illuminating contents of the conduit flowing through the second location;
   a processor operably connected to the first and second video head assemblies, the processor receiving and processing video frames from the first and second video head assemblies, respectively, the processor having:
   means for isolating image objects related to phases of a fluid flowing in the conduit captured in image frames taken by the video head assemblies;
   means for separating image objects by phase into object classes;
   means for cross-correlating the object classes from the first location with the corresponding object classes from the second location;
   means for detecting delay time between the object classes in the image frames;
   means for calculating flow speed of the object classes through the conduit based on the delay time;
   means for calculating an aggregate speed of each of the phases based on the object classes associated with the phases; and
   means for determining the flow speed and the flow type of the phases by aggregation of the aggregate speeds of the phases.

2. The multiphase flow measurement system according to claim 1, wherein the first location is at a downstream side of the fluid flow, and the second location is at an upstream side of the fluid flow.

3. The multiphase flow measurement system according to claim 1, further comprising:
   means for determining a fractional area occupied by a specific one of the phases; and
   means for estimating a volume fraction of the specific one of the phases based on the fractional area.

4. The multiphase flow measurement system according to claim 1, wherein said first video head assembly comprises at least two perpendicularly mounted video heads and said second video head assembly comprises at least two perpendicularly mounted video heads, the system further comprising:
   means for creating a 3D image of the fluid flow from the perpendicularly mounted video heads; and
   means for estimating a volume fraction of a field of view region from the 3D image.

5. The multiphase flow measurement system according to claim 1, further comprising:
   means for collecting statistics about phase traits of the phase in the fluid flow from the image frames, the phase traits including distribution of the traits in the phases and estimated velocities of the phases; and means for predicting a flow type of said flow based on the distribution of the phase traits and the estimated velocities of the phases.

\* \* \* \* \*